United States Patent [19]
Fujii

[11] Patent Number: 5,189,530
[45] Date of Patent: Feb. 23, 1993

[54] IMAGE PROCESSING APPARATUS
[75] Inventor: Akio Fujii, Yokohama, Japan
[73] Assignee: Canon Kabushiki Kaisha, Tokyo, Japan
[21] Appl. No.: 872,050
[22] Filed: Apr. 22, 1992
[30] Foreign Application Priority Data
  Apr. 23, 1991 [JP] Japan ................. 3-092288
[51] Int. Cl.⁵ ............................... G06K 9/00
[52] U.S. Cl. .................... 358/458; 358/433
[58] Field of Search ........ 358/458, 455, 456, 429–430, 358/433, 427; 382/50, 51, 52
[56] References Cited
U.S. PATENT DOCUMENTS
  4,797,945  1/1989  Suzuki et al. ................. 382/56
  4,887,151 12/1989  Wataya ........................ 358/80
  4,974,071 11/1990  Maeda ......................... 358/80
  5,023,919  6/1991  Wataya ........................ 382/54
  5,060,285 10/1991  Dixit et al. .................. 358/433

Primary Examiner—Stephen Brinich
Attorney, Agent, or Firm—Fitzpatrick, Cella, Harper & Scinto

[57] ABSTRACT

The invention is intended to improve image quality in a process of image coding. In an apparatus for quantizing conversion data resulted from converting image information into frequency regions and then coding the quantized data, a coefficient to be multiplied by a chrominance quantizing matrix is set depending on a coefficient to be multiplied by a luminance quantizing matrix for an improvement in color reproducibility.

10 Claims, 8 Drawing Sheets

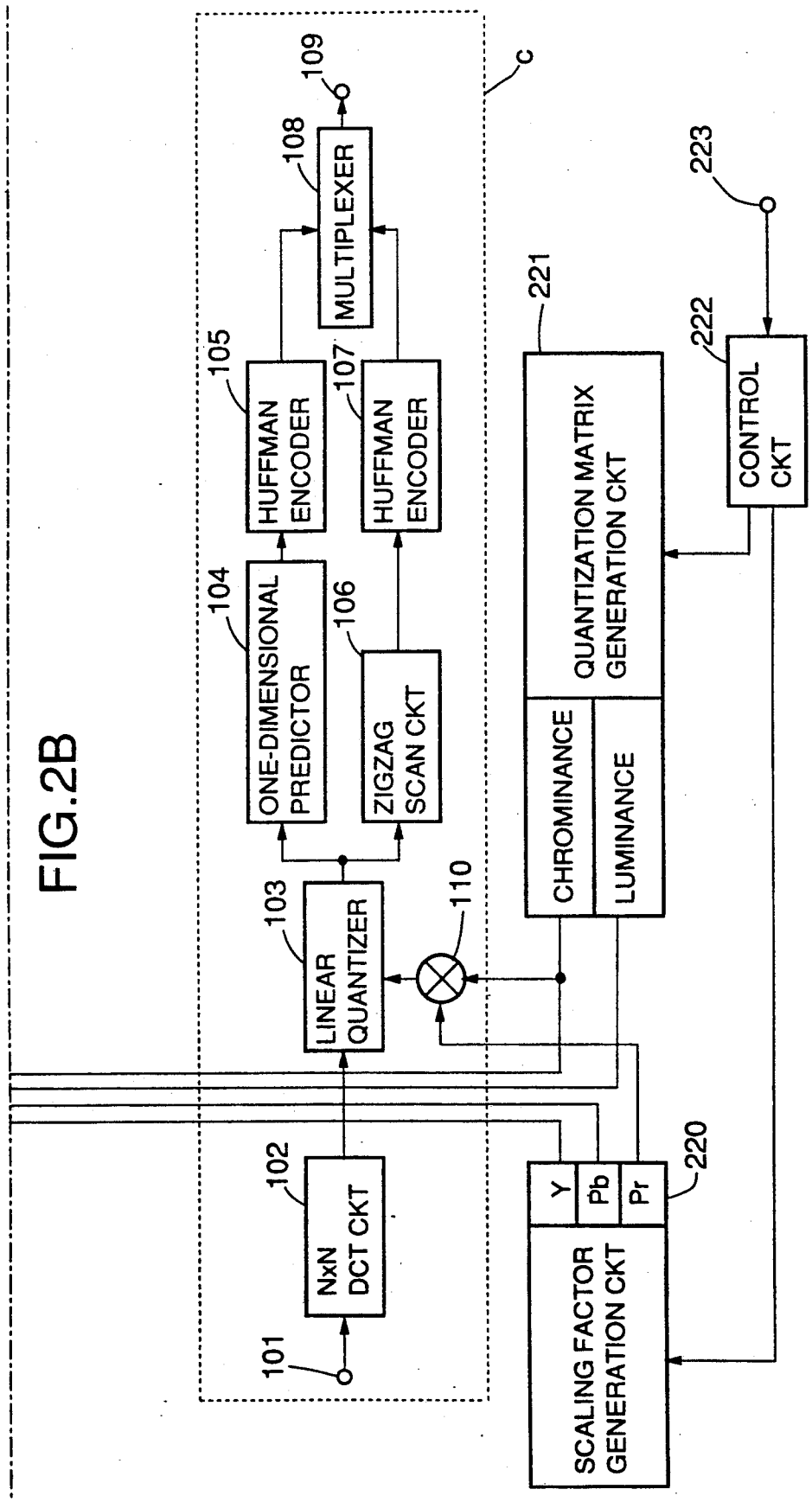

FIG.5

| | | | | | | | |
|---|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

IMAGE PROCESSING APPARATUS

BACKGROUND OF THE INVENTION

1. Field of the Invention

The present invention relates to an image processing method and apparatus, and more particularly to an image processing method and apparatus for quantizing frequency conversion data and coding the quantized conversion data.

2. Related Background Art

A number of color image compressing techniques have been proposed in the past. As a typical one of color still image coding techniques, there is proposed an adaptive discrete cosine transform coding method (hereinafter referred to as an ADCT method).

FIG. 3 is a conceptual view showing arrangement of an image coding apparatus using the ADCT method. It is assumed that an input image is given by data converted into 8 bits, i.e., 256 gradations, for each color in a not-shown analog-to-digital converter (hereinafter referred to as an A/D converter) and the number of colors is three, i.e., luminance Y, color $P_B$ and color $P_R$, in this case.

The digital data of the luminance signal Y inputted through an input terminal 101 in FIG. 3 is subjected to two-dimensional discrete cosine transform (hereinafter abbreviated as DCT) in an N×N DCT circuit 102 in units of subblocks each comprising N×N pixels. Thereafter, the conversion coefficients are linearly quantized in a linear quantizer 113 with a quantizing step size being different for each of the conversion coefficients. The quantizing step sizes for respective conversion coefficients are given by values resulted from multiplying $2^S$ by quantization matrix elements of N×N in consideration of the fact that visual sensitivity for quantizing noise is different for each of the conversion coefficients. Here, S is 0 or a positive or negative integer and called a scaling factor. The image quality or the data to be generated is controlled depending on the value of S.

One example of the quantization matrix elements is shown in FIG. 5 in the case of 8×8. A quantization matrix generation circuit 111 is controlled by a control circuit 302 and generates a quantization matrix for the luminance signal Y. A switch 114 is changed over to select the side a for supplying the quantization matrix for the luminance signal Y to a multiplier 110. Using the scaling factor S supplied from a scaling factor generation circuit 301, the multiplier 110 multiplies $2^S$ by each quantized element of the quantization matrix. The multiplied results are supplied to the linear quantizer 103 where the conversion coefficients are linearly quantized by using the supplied results.

After the quantization, direct current conversion coefficients (hereinafter referred to as DC components) are supplied to a one-dimensional predictor 104 to calculate prediction values using several subblocks adjacent to each other, and prediction errors are subjected to Huffman coding in a Huffman encoder 105. More specifically, after dividing quantized outputs of the prediction errors into groups, the ID numbers of the groups to which the respective prediction errors belong are first subjected to Huffman coding, and which values in each group correspond to the respective prediction errors are then represented by using equi-length codes.

The conversion coefficients other than the above DC components, i.e., the alternating current conversion coefficients (hereinafter referred to as AC components), are supplied to a zigzag scan circuit 106 in which the AC components are scanned in a zigzag manner with two-dimensional frequencies from low-frequency component to high-frequency component as shown in FIG. 4, followed by Huffman coding in a Huffman encoder 107. More specifically, those conversion coefficients for which the quantized outputs are not 0 (hereinafter referred to as significant coefficients) are divided into groups depending on their values. The ID numbers of the divided groups and the numbers of those conversion coefficients which are present between every two significant coefficients and for which the quantized outputs are 0 (hereinafter referred to as insignificant coefficients) are subjected in pair to Huffman coding. Subsequently, which values in each group correspond to the significant coefficients are represented by using equi-length codes.

Respective code strings of the DC components and the AC components are multiplexed in a multiplexer 108 and outputted from an output terminal 109.

Next, when the digital data of the chrominance signals $P_B$, $P_R$ are inputted through the input terminal 101, the control circuit 302 controls the quantization matrix generation circuit 111 to generate quantization matrices for the chrominance signals $P_B$, $P_R$. The switch 114 is changed over to select the side b for supplying the quantization matrices for the chrominance signals to the multiplier 110. Subsequently, the chrominance signals processed in a like manner to the luminance signal Y as mentioned above for Huffman coding.

When the compression rate requires to be increased (for a higher degree of compression) from limitations in a transmission path or other reasons, control information is entered from a input terminal 303 so that the control circuit 302 controls a scaling factor generation circuit 301 to increase the scaling factor S. Conversely, in order to obtain a high-quality image, the scaling factor S is made smaller.

However, because the scaling factor S of the same value is used when coding the luminance signal Y and the chrominance signals $P_B$, $P_R$ in the above prior art, there has accompanied a shortcoming that image quality in color areas (particularly in a red area to which human eyes are more sensitive) deteriorates to a remarkable extent, when the value of the scaling factor S is increased to obtain a high degree of compression.

SUMMARY OF THE INVENTION

An object of the present invention is to solve the problem as set forth above.

Specifically, an object of the present invention is to provide an image processing apparatus which can realize satisfactory reproducibility of colors.

To achieve the above object, according to the present invention, there is disclosed an image processing apparatus comprising generating means for generating first spatial frequency component data relating to luminance data and second spatial frequency component data relating to chrominance data; dividing means for dividing the first and second spatial frequency component data into a plurality of blocks, respectively, each of said blocks having a plurality of spatial frequency component data; first quantizing means for quantizing the first spatial frequency component data for each of said blocks; second quantizing means for quantizing the second sptial frequency component data for each of said blocks; first memory means for storing first set of quantization parameters for said first quantizing means; second memory means for storing second set of quantization parameters for said second quantizing means; and control means for generating first coefficient for varying the first set of parameters and second coefficient for varying the second set of parameters.

Another object of the present invention is to provide an image encoding method which is suitable for encoding of moving images.

Still another object of the present invention is to provide a high-speed image encoding method.

Still another object of the present invention is to provide a highly-efficient image encoding method.

Other objects and forms of the present invention will be apparent from the following description in conjunction with the drawings and the attached claims.

BRIEF DESCRIPTION OF THE DRAWINGS

FIGS. 2A-2B are block diagrams showing a second embodiment of the present invention;

FIG. 5 is a diagram showing one example of quantization matrix elements; and

DETAILED DESCRIPTION OF PREFERRED EMBODIMENTS

In the following embodiments of the present invention, a coefficient factor to be multiplied by quantization matrix elements for a chrominance signal is controlled depending on a scaling factor value $S_0$ of a luminance signal Y, thereby reducing an extent of deterioration in image quality even when the scaling factor value is increased for a higher compression rate.

Figure 1:
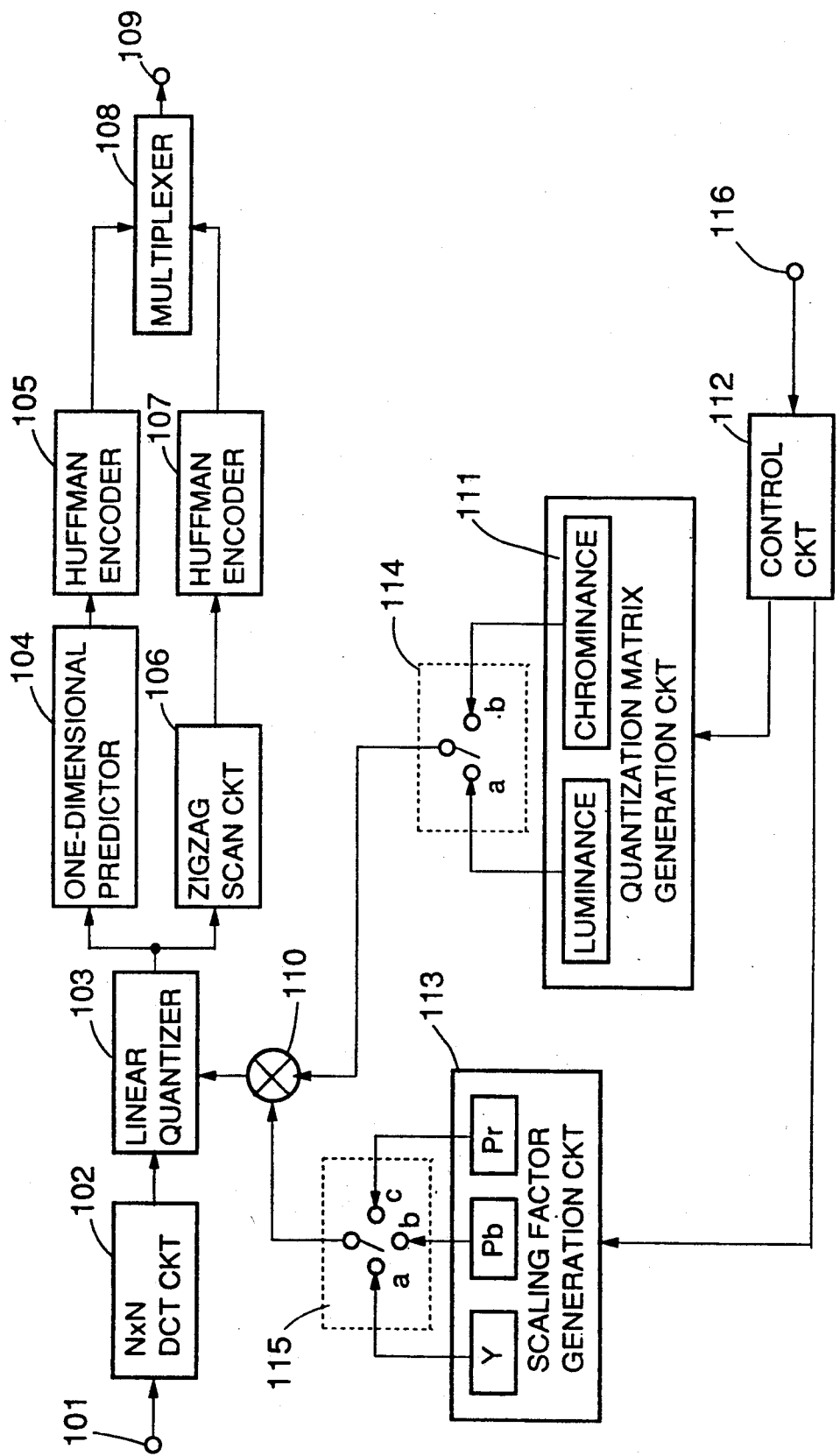
FIG. 1 is a block diagram showing a first embodiment of the present invention.

FIG. 1 is a block diagram showing a first embodiment of the present invention. In the drawing, denoted by reference numeral 101 is an input terminal for digital image data, 102 is a DCT ciruit per N×N pixels, 103 is a linear quantizer for linearly quantizing conversion coefficients, 104 is a one-dimensional predictor for DC components, 105 is a Huffman encoder, 106 is a zigzag scan circuit for scanning AC components in a zigzag pattern, 107 is a Huffman encoder, 108 is a multiplexer for multiplexing codes of the DC and AC components, and 109 is an output terminal. 110 is a multiplier for multiplying quantization matrix elements for luminance or chrominance by a scaling factor, 111 is a quantization matrix generation circuit for generating quantization matrices for luminance and chrominance, 112 is a control circuit for controlling the quantization matrix generation circuit and a scaling factor generation circuit, 113 is a scaling factor generation circuit for generating scaling factors or coefficients to be multiplied for a luminance signal Y and chrominance signals $P_B$, $P_R$, 114, 115 are select switches, and 116 is an input terminal through which control information (such as an amount of coded data) is entered to the control circuit.

Figure 3:
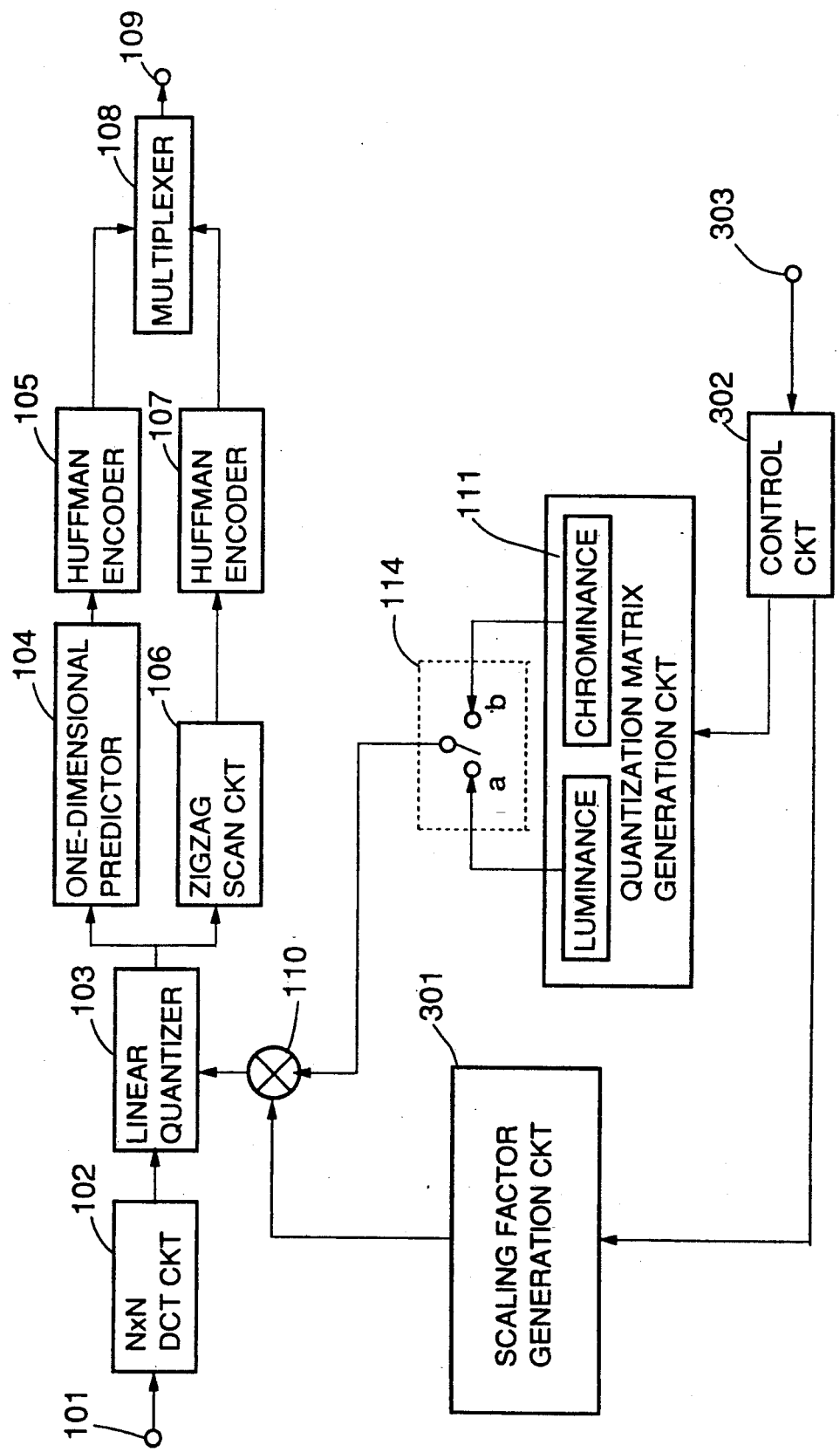
FIG. 3 is a block diagram showing the prior art.
Figure 4:
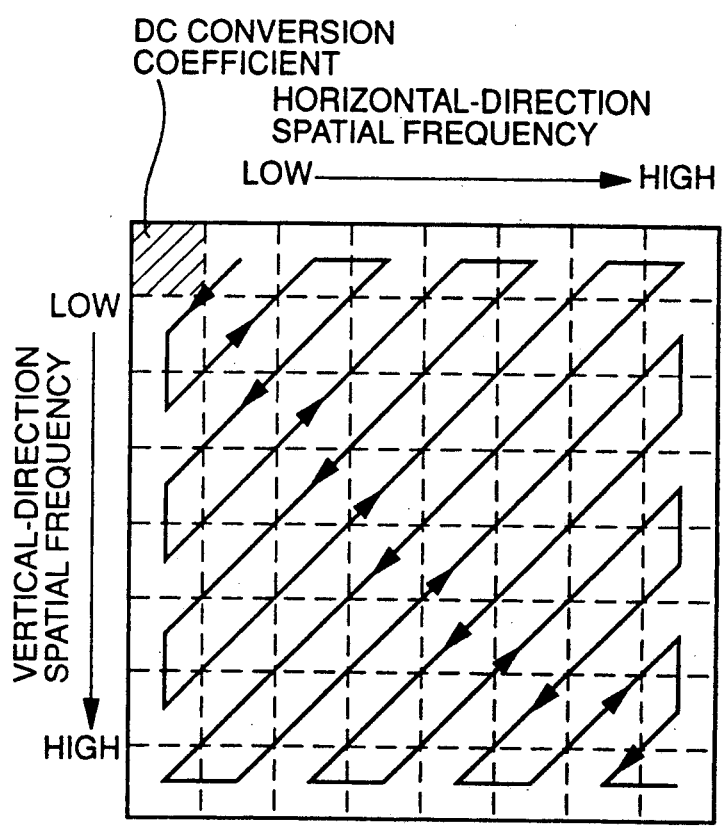
FIG. 4 is a diagram representing a zigzag scan.

Note that components having the same functions as those in FIG. 3 are denoted by the same reference numerals. The following description will be made about only different parts between the prior art and this embodiment.

The scaling factor generation circuit 113 is controlled by the control circuit 112 to generate the scaling factor value $S_0$ to be multiplied by the quantization matrix elements for the luminance signal Y and, at this time, the switch 115 is changed over to select the contact a. When conversion coefficients of the chrominance signal $P_B$ are linearly quantized by the linear quantizer 103 after coding the luminance signal Y, the scaling factor generation circuit 113 is controlled by the control circuit 112 to generate a scaling factor $S_B$ for $P_B$, and the switch 115 is changed over to select the contact b. In this case, $S_B$ is generated as a function of $S_0$, for example, as expressed below:

$$S_B = f_B(S_0)$$

When conversion coefficients of the chrominance signal $P_R$ are linearly quantized by the linear quantizer 103, the scaling factor generation circuit 113 is controlled by the control circuit 112 to generate a scaling factor $S_R$ for $P_R$, and the switch 115 is changed over to select the contact c. In this case, $S_R$ is generated as a function of $S_0$, for example, as expressed below:

$$S_R = f_R(S_0)$$

Example of function forms of $S_B$, $S_R$ usable in this embodiment are enumerated below:

i $$S_B = f_B(S_0) = S_0 + XB,$$

$$S_R = f_R(S_0) = S_0 - XR$$

where XB, XR are positive constants ii $$S_B = f_B(S_0) = \begin{cases} S_0 \times KB_1 & (S_0 \geq 0) \\ S_0 \times KB_2 & (S_0 < 0) \end{cases}$$

$$S_R = f_R(S_0) = \begin{cases} S_0 \times KR_1 & (S_0 \geq 0) \\ S_0 \times KR_2 & (S_0 < 0) \end{cases}$$

where $KB_1$, $KB_2$, $KR_1$, $KR_2$ are constants iii $$S_B = f_B(S_0) = S_0 \times K_B(S_0),$$

$$S_R = f_R(S_0) = S_0 \times K_R(S_0)$$

where $K_B(S_0)$, $K_R(S_0)$ are functions of $S_0$ iv $$S_B = f_B(S_0) = S_0$$

$$S_R = f_R(S_0) = \begin{cases} S_0 & (S_0 < A) \\ C & (S_0 \geq A) \end{cases}$$

where C, A are constants

Optimum ones of the above functions and constants are selected depending on the compression rate required and the nature of an input image so that deterioration of image quality is minimized. This selection can be achieved by, for example, repeating the coding process several times with different quantization characteristics or performing the coding processes with different quantization characteristics in parallel as explained later.

As an alternative method of controlling respective quantization steps for the chrominance signals $P_B$, $P_R$, the coefficients to be multiplied by the quantization matrix elements for chrominance signals may be themselves controlled rather than generating the scaling factors. In this case, the scaling factor generation circuit 113 generates coefficients $M_B$, $M_R$ to be multiplied for the chrominance signals $P_B$, $P_R$ in place of the scaling factors. $M_B$, $M_R$ are functions of $S_0$ as expressed below:

$$M_B = g_B(S_0), M_R = g_R(S_0)$$

Example of function forms of $M_B$, $M_R$ usable in this case are enumerated below:

v $$M_B = g_B(S_0) = 2^{S_0} + TB,$$

$$M_R = g_R(S_0) = 2^{S_0} - TR$$

where TB, TR are positive constants vi $$M_B = g_B(S_0) = CB \times 2^{S_0},$$

$$M_R = g_R(S_0) = CR \times 2^{S_0}$$

where CB, CR are constants vii $$M_B = g_B(S_0) = 2^{S_0} \times C_B(S_0),$$

$$M_R = g_R(S_0) = 2^{S_0} \times C_R(S_0),$$

where $C_B(S_0)$, $C_R(S_0)$ are functions of $S_0$ viii $$M_B = g_B(S_0) = 2^{S_0}$$

$$M_R = g_R(S_0) = \begin{cases} 2^{S_0} & (S_0 < B) \\ CO & (S_0 \geq B) \end{cases}$$

Optimum ones of the above functions and constants are selected depending on the compression rate required and the nature of an input image so that deterioration of image quality is minimized.

The compression rate can be changed by entering control information to the control circuit 112 through the input terminal 116 and changing the scaling factor value $S_0$. The mode for the method of deciding the quantizing steps for the chrominance signals $P_B$, $P_R$ can also be changed by entering mode information to the control circuit 112 through the input terminal 116.

As mentioned above, since the scaling factor values of the luminance signal Y and the chrominance signals $P_B$, $P_R$ are depending on the scaling factor value $S_0$ of the luminance signal Y (such that in need of increasing the compression rate, a smaller scaling factor value is set for $P_R$ which has higher visual sensitivity and a larger scaling factor value is set for $P_B$), an image with less deterioration in image quality can be obtained even when the compression rate is increased. Further, by controlling the coefficients to be multiplied by the quantization matrix elements for the chrominance signals using function such as $f_B$, $f_R$, $g_B$, $g_R$, the coding can be performed more efficiently than the case of setting those coefficients individually.

Moreover, even with the image data having other input form (such as GBR inputs) than the foregoing, the similar operating effect can also be achieved by weighing the coefficients to be multiplied by the quantization matrix elements in a like manner to the above case in match with the visual sensitivity of human eyes (e.g., such that in the case of GBR inputs, weighing is applied to the G input near a luminance signal, the B input and the R input in this order).

ANOTHER EMBODIMENT

Figure 2A:
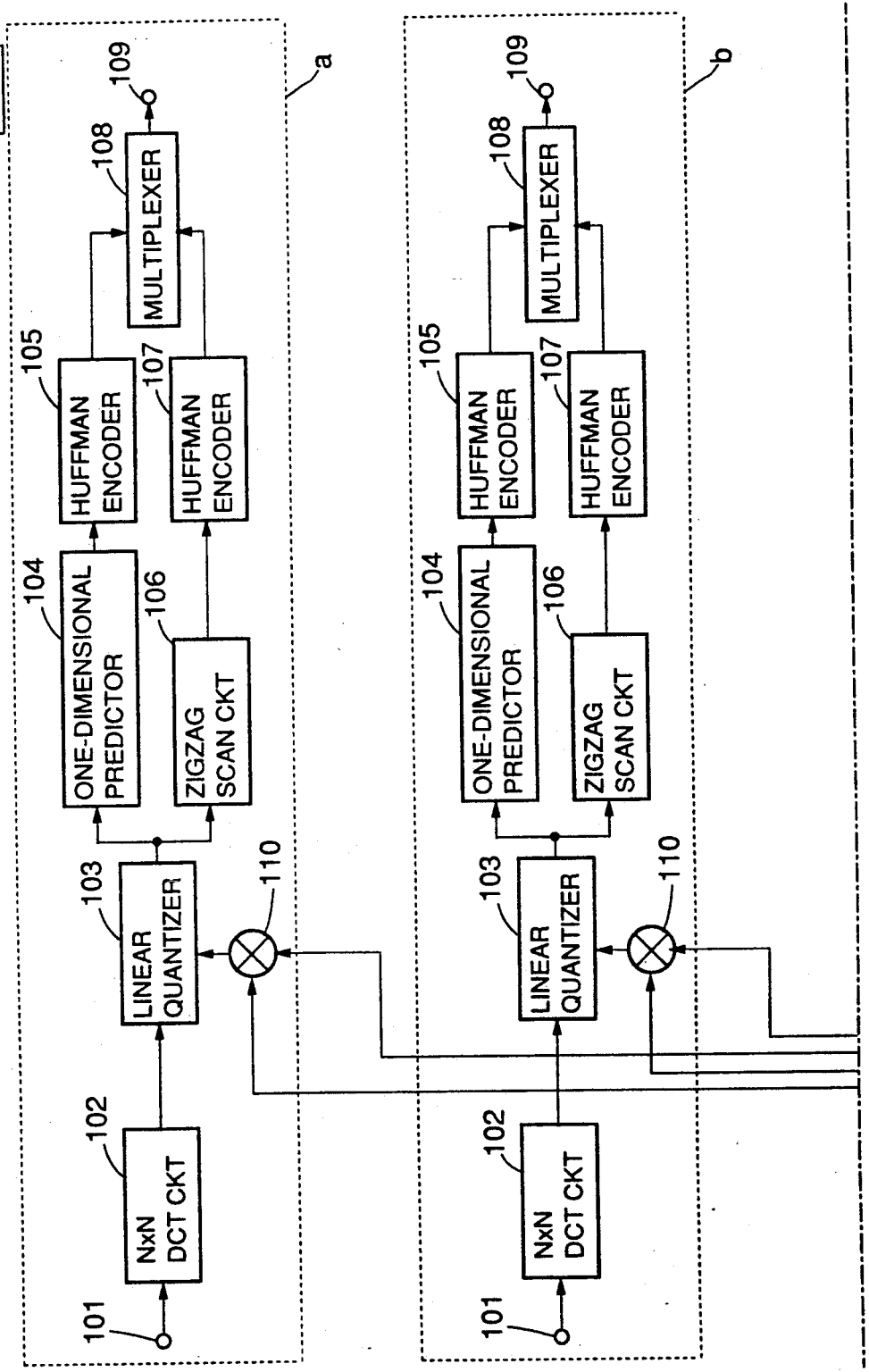

FIG. 2 shows a second embodiment of the present invention. Components having the same functions as those in the prior art are denoted by the same reference numerals and will not be described here. Blocks a, b and c circumscribed by broken lines all function in a like manner. However, an input to the block a is only the luminance signal Y, an input to the block b is only the chrominance signal $P_B$, and an input to the block c is only the chrominance signal $P_R$. Thus, the luminance signal and the chrominance signals are separately processed in parallel for coding. Accordingly, a control circuit 222 supplies a control signal suitable for parallel processing to a quantization matrix generation circuit 221 so that the quantization matrices for the luminance signal and the chrominance signals are generated almost at the same timing. Likewise, a scaling factor generation circuit 220 is controlled by the control circuit 222 to generate scaling factors $S_Y$, $S_B$, $S_R$ for the luminance signal Y and the chrominance signals $P_B$, $P_R$ almost at the same timing. $S_Y$, $S_B$, $S_R$ are functions of $S_0$ as expressed below:

$$S_Y = S_0, S_B = f_B(S_0), S_R = f_R(S_0)$$

Alternatively, the scaling factor generation circuit 220 may generate coefficients to be directly multiplied by the quantization matrix elements for the chrominance signals. In this case, coefficients $M_B$, $M_R$ used for the chrominance signals $M_B$, $M_R$ are given by:

$$M_B = g_B(S_0), M_R = g_R(S_0)$$

By so arranging, it is possible to not only obtain an image with less deterioration in image quality even at the increased compression rate, but also adapt to high-speed coding through parallel processing, which permits real-time coding of moving images and the like.

As explained above, by setting the scaling factor values or the coefficients themselves to be multiplied by the quantization matrix elements for the luminance signal Y and the chrominance signals $P_B$, $P_R$ separately, and controlling the scaling factor values or the coefficients themselves to be multiplied by the quantization matrix elements for the chrominance signals $P_B$, $P_R$ depending on the scaling factor value $S_0$ of the luminance signal Y, there can be obtained an image with less deterioration in image quality corresponding to the compression rate (namely, an image with less deterioration in quality of color images can be obtained even at the increased compression rate through such a control, for example, that in need of increasing the compression rate, a smaller scaling factor value than that of the luminance signal Y is set for the chrominance $P_R$ which has higher visual sensitivity and a larger scaling factor value is set for the chrominance signal $P_B$). Further, by controlling the coefficients to be multiplied by the quantization matrix elements for the chrominance signals using functions, the coding can be performed more efficiently than the case of setting those coefficients individually.

Thus, according to the present invention, it is possible to provide an image encoding apparatus and method with which a reproduced image of high quality can be obtained.

Figure 6A:
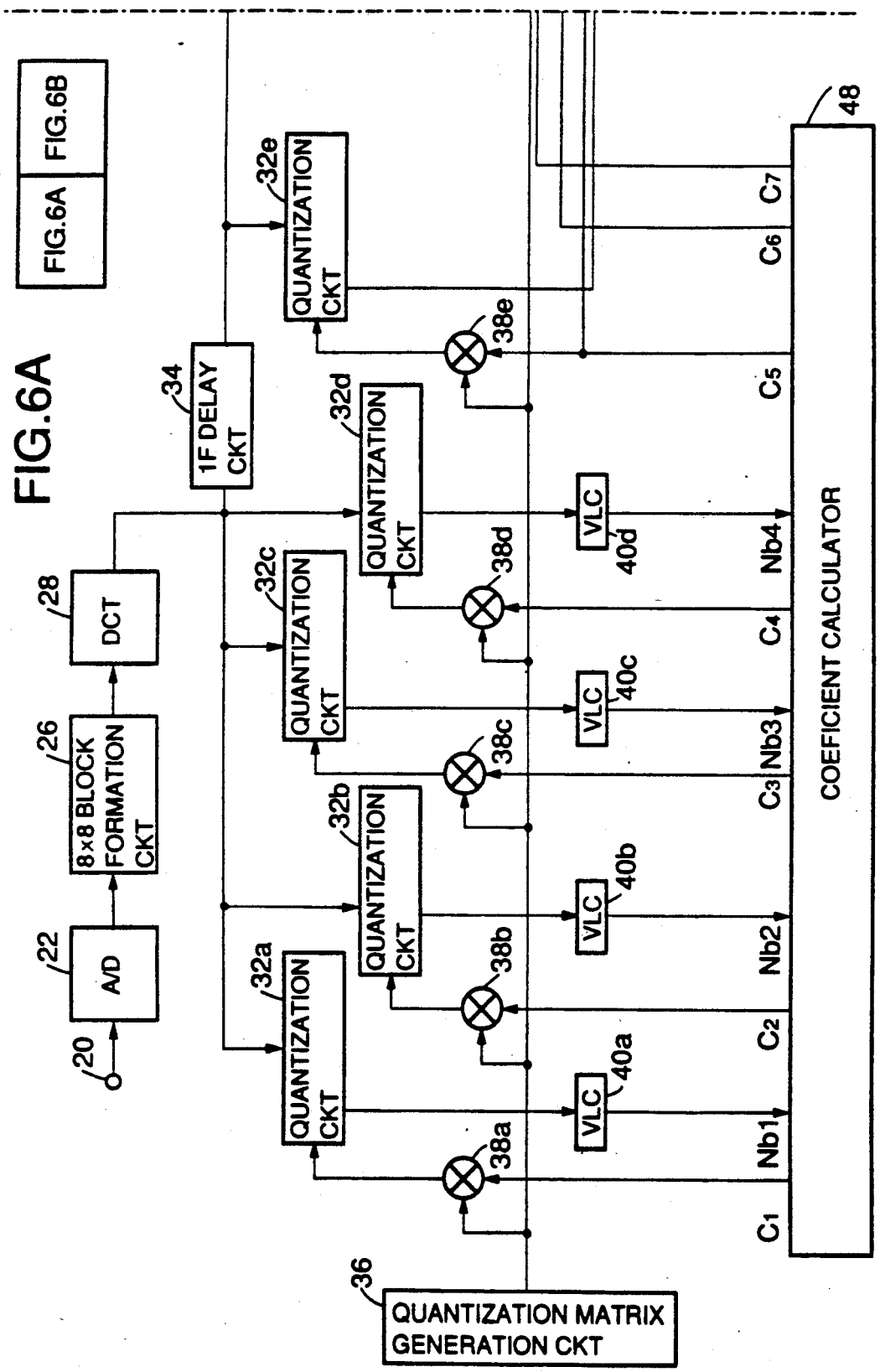
FIGS. 6A-6B are block diagrams showing an application example of the present invention.
Figure 6B:
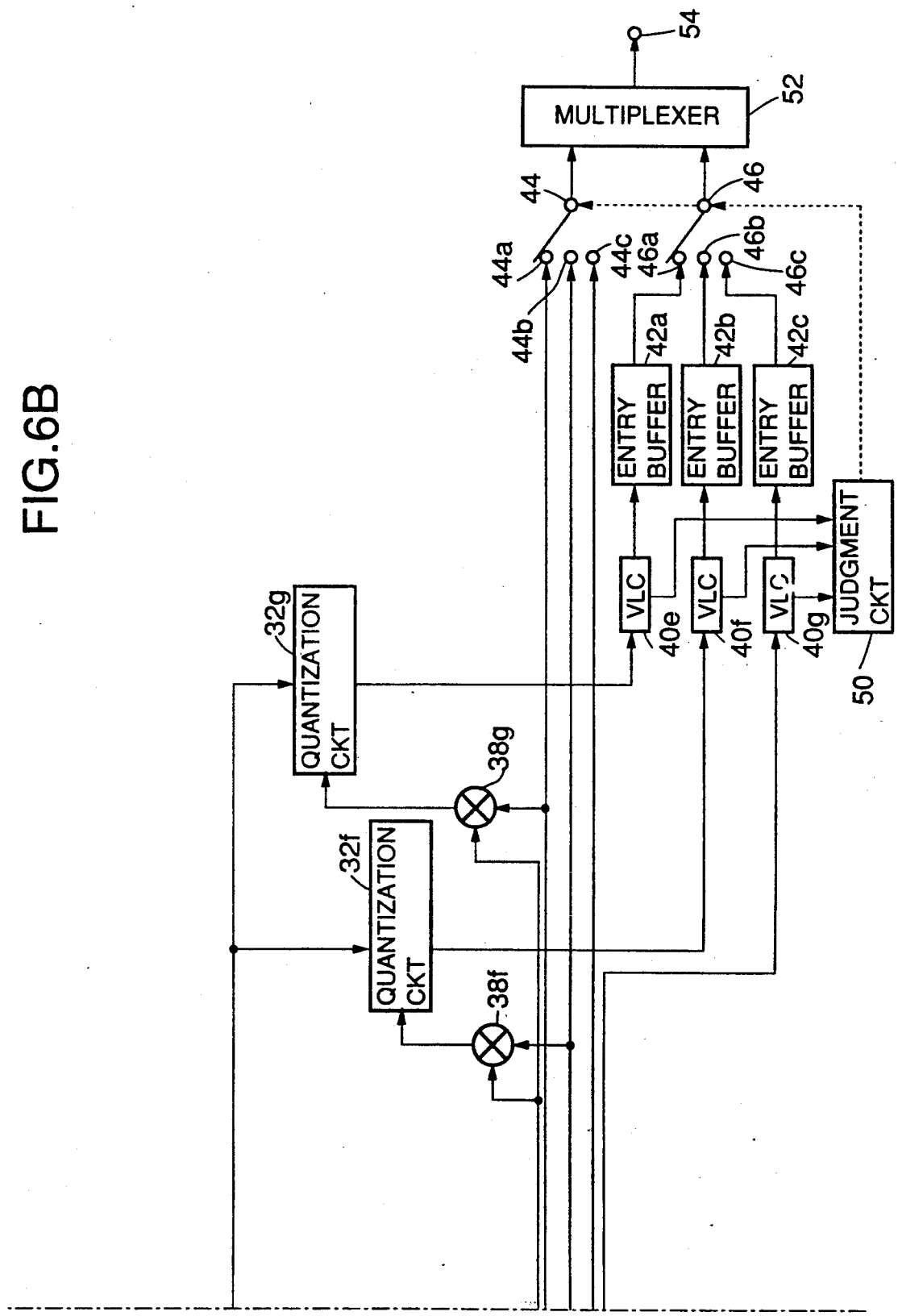

An example of the present invention applied to a moving image encoding apparatus will be described below in detail. FIG. 6 is a block diagram of the apparatus.

In the drawing, denoted by 20 is an input terminal for an analog TV signal. The TV signal sensed by using a CCD sensor and inputted through the terminal 20 is converted by an A/D converter 22 into a digital signal of 8 bits. The digital signal is divided into blocks each comprising (8×8) pixels by an (8×8) block formation circuit 26 which operates in a like manner to the (N×N) DCT circuit 102 in FIG. 1, the blocks being supplied to a DCT circuit 28 one by one.

Pixel data $D_{11}$ to $D_{88}$ of each block are converted by the DCT circuit 28 into a data matrix $X_{11}$ to $X_{88}$ for two-dimensional frequency regions as with the case of FIG. 1, followed by being supplied to quantization circuits 32a to 32d and a 1F (one-frame) delay circuit 34.

A quantization matrix generation circuit 36 generates similar matrices to those generated from the aforesaid quantization matrix generation circuit 111.

Supplied to multipliers 38a to 38d are initial coefficients $C_1$ to $C_4$ as control coefficients (scaling factors) C from a coefficient calculator 48. As with the case of FIG. 1, the multipliers 38a to 38d multiply outputs of the quantization matrix generation circuit 36 and the control coefficients $C_X$ for respective components, i.e., ($W_{ij} \times C_X/C_0$), the multiplied results being outputted to the quantization circuits 32a to 32d. The quantization circuits 32a to 32d respectively quantize conversion coefficients with the quantizing steps controlled by the control coefficients $C_1$ to $C_4$ and output the quantized values to VLCs (Variable Length Coders) 40a to 40d.

In this embodiment, the VLCs 40a to 40d do not output the actual coded data, but output only information nb1 to nb4 of total bit number for each image as resulted from the similar processing to an ordinary VLC.

Using the information nb1 to nb4 outputted from the VLCs 40a to 40d and the control coefficients $C_1$ to $C_4$, the coefficient calculator 48 calculates a control coefficient $C_5$ desired for the total bit number and outputs it to a multiplier 38e.

The coefficient calculator 48 also outputs control coefficients $C_6$, $C_7$ as an approximate value of $C_5$ to multipliers 38f, 38g and, on the other hand, outputs the control coefficients $C_5$ to $C_7$ to terminals 44a to 44c, respectively.

It is here assumed that when $C_n \leq C_5 \leq C_{n+1}$ holds for $C_5$, $C_6$ and $C_7$ meet the relationships $C_n \leq C_6 < C_5$ and $C_5 < C_7 \leq C_{n+1}$, respectively, and n meets the relationship $1 \leq n \leq 3$.

The multipliers 38e to 38g respectively multiply outputs of the quantization matrix generation circuit 36 and the control coefficients $C_5$ to $C_7$ as with the multipliers 38a to 38d, the multiplied results being outputted to quantization circuits 32e to 32g within a vertical blanking period.

Meanwhile, those DCT conversion coefficients resulted from delaying DCT conversion coefficients through one frame by the 1F delay circuit 34 are inputted to the quantization circuits 32e to 32g.

The conversion coefficients are quantized in the quantization circuits 32e to 32g with the quantizing steps controlled by the control coefficients $C_5$ to $C_7$, and the quantized values are outputted to VLCs 40e to 40g. In this embodiment, the VLCs 40e to 40g output the actual coded data to entry buffers 42a to 42c and also output the total bit numbers nb5 to nb7 to a judgment circuit 50. The judgment circuit 50 delivers such an output to switches 44 and 46 as to select the quantization result which is less than the desired total bit number and nearest thereto. The entry buffers 42a to 42c store the coded data until the judgment circuit 50 issues the judgment result. The switch 44 selects one of the control coefficients in accordance with the judgment result and outputs it to a multiplexer 52. Also, the switch 46 selects one of the coded data and outputs it to the multiplexer 52. The multiplexer 52 multiplexes the control coefficient and the coded data, followed by outputting to an output terminal 54.

The scaling factor for quantizing the chrominance data may be controlled independently rather than being dependent on the scaling factor for quantizing the luminance data as stated before. In other words, the luminance data and the chrominance data may be coded in a completely parallel manner.

The scaling factor may be fixed in one frame of an image as mentioned before, or may be varied per block of N×N pixels.

Further, the scaling factor may be controlled depending on the amount of coded data resulted from the coding, or may be controlled depending on whether the original image is a line image including characters and the like or a natural image.

Additionally, while the component Y is extracted as luminance data and the components $P_B$, $P_R$ are extracted as chrominance data in the above embodiments, those components may be (Y, $C_R$, $C_B$), (L*, a*, b*), (L*, u*, v*), (Y, u, v) or the like.

Moreover, the functions of the control circuit 112, the scaling factor generation circuit 113 and the quantization matrix generation circuit 111 can be executed by a CPU and a RAM, a ROM, etc. connected to the CPU.

It should be understood that the present invention is not limited to the embodiments as set forth above and may be variously changed and modified within the scope of the invention defined in the attached claims.

What is claimed is:

1. An image processing apparatus comprising:
    generating means for generating first spatial frequency component data relating to luminance data and second spatial frequency component data relating to chrominance data;
    dividing means for dividing the first and second spatial frequency component data into a plurality of blocks, respectively, each of said blocks having a plurality of spatial frequency component data;
    first quantizing means for quantizing the first spatial frequency component data for each of said blocks;
    second quantizing means for quantizing the second spatial frequency component data for each of said blocks;
    first memory means for storing first set of quantization parameters for said first quantizing means;

second memory means for storing second set of quantization parameters for said second quantizing means; and control means for generating first coefficient for varying the first set of parameters and second coefficient for varying the second set of parameters.

2. An image processing apparatus according to claim 1, further comprising input means for inputting image data relating to the first and second spatial frequency component data.

3. An image processing apparatus according to claim 2, wherein said input means comprises a CCD sensor.

4. An image processing apparatus according to claim 1, wherein said dividing means divides the data into blocks each comprising N×N pixels.

5. An image processing apparatus according to claim 1, wherein said first set of quantization parameters is smaller than said second set of quantization parameters.

6. An image processing apparatus according to claim 1, wherein said second coefficient depends on said first coefficient.

7. An image processing apparatus according to claim 1, wherein said apparatus is a moving image coding apparatus.

8. An image processing apparatus according to claim 1, wherein said apparatus performs quantizing in parallel by using a pair of first and second coefficients different from each other.

9. An image processing apparatus according to claim 1, further comprising coding means which makes the data quantized by said first and second quantizing means subjected to variable length coding.

10. An image processing method comprising steps of:

generating step of generating first spatial frequency component data relating to luminance data and second spatial frequency component data relating to chrominance data;

dividing step of dividing the first and second spatial frequency component data into a plurality of blocks, respectively, each of said blocks having a plurality of spatial frequency component data;

first quantizing step of quantizing the first spatial frequency component data for each of said blocks; and second quantizing step of quantizing the second spatial frequency component data for each of said blocks, wherein first set of quantization parameters is used for said first quantizing step and second set of quantization parameters is used for said second quantizing step and further first coefficient for varying the first set of parameters and second coefficient for varying the second set of parameters are used.

* * * * *